United States Patent
Nakai (10) Patent No.: US 8,423,997 B2
(45) Date of Patent: Apr. 16, 2013

(54) SYSTEM AND METHOD OF CONTROLLING VIRTUAL MACHINE

(75) Inventor: Hidehiko Nakai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 356 days.

(21) Appl. No.: 12/461,254

(22) Filed: Aug. 5, 2009

(65) Prior Publication Data

US 2010/0083250 A1  Apr. 1, 2010

(30) Foreign Application Priority Data

Sep. 30, 2008  (JP) .................. 2008-252904

(51) Int. Cl.
*G06F 9/455* (2006.01)
*G06F 11/00* (2006.01)
*G06F 13/00* (2006.01)

(52) U.S. Cl.
USPC ........... 718/1; 714/34; 714/21; 711/162; 711/161; 711/100

(58) Field of Classification Search .................. None
See application file for complete search history.

(56) References Cited

U.S. PATENT DOCUMENTS

| | | | | |
|---|---|---|---|---|
| 7,343,521 | B2* | 3/2008 | Kitamorn et al. | 714/34 |
| 7,634,679 | B2* | 12/2009 | Quintiliano | 714/4.11 |
| 7,669,020 | B1* | 2/2010 | Shah et al. | 711/162 |
| 7,917,617 | B1* | 3/2011 | Ponnapur et al. | 718/1 |
| 8,010,760 | B2* | 8/2011 | Maki et al. | 711/162 |
| 2007/0006226 | A1* | 1/2007 | Hendel | 718/1 |

FOREIGN PATENT DOCUMENTS

| | | |
|---|---|---|
| JP | 06-052130 | 2/1994 |
| JP | 2007-226413 | 9/2007 |
| JP | 2008-217728 | 9/2008 |

OTHER PUBLICATIONS

Sankalp Agarwal; Distributed Checkpointing of Virtual Machines in Xen Framework, May 2008, Master of Technology Thesis.*
Japanese Office Action mailed May 8, 2012 issued in corresponding Japanese Patent Application No. 2008-252904.
Kohta Nakashima et al., "Design and Evaluation of a Virtual Machine Migration Using RDMA Data Transfer Mechanism over 10 Gb Ethernet", Journal of the Information Processing Society, Vo. 48, No. SIG 18 (ACS20), Dec. 2007, pp. 69-82, Abstract Published in English.

* cited by examiner

*Primary Examiner* — Meng An
*Assistant Examiner* — Bing Zhao
(74) *Attorney, Agent, or Firm* — Staas & Halsey LLP (57) ABSTRACT

According to an aspect of the embodiment, a host virtual machine operated on the CPU controls the virtual machine system and a guest virtual machine, and has save information of system information which defines a save location to save the system information of the guest virtual machine. The save location is in the storage device used by the host virtual machine. A virtual machine monitor operated on the CPU controls the plurality of virtual machines, and includes monitoring unit which monitors the guest virtual machine to detect occurrence of a failure in the guest virtual machine, and collecting unit which collects the system information from the save location based on the save information of system information when the monitoring unit detects the failure in the guest virtual machine.

6 Claims, 8 Drawing Sheets

```
#GUEST ENVIRONMENT SETTING OF GUEST OS 1       ~111
guest_name=domain_1
cpu_num=2
memory=1024
mac_address=02:17:42:2F:06:76
disk_1=physical_disk=/dev/sdd1:virtual_disk=had
disk_2=physical_disk=/dev/sde1:virtual_disk=sda
disk_3=physical_disk=/dev/sde2:virtual_disk=sdb
                :
```

```
#DEFINITION OF GUEST OS 1                      ~112
[guest_domain_1]
##COLLECTION KIND OF GUEST OS 1
collection_kind=dump, sysinfo
##SYSTEM INFORMATION STORAGE DIRECTORY OF GUEST OS 1
DISK PARTITION
disk_partition=disk1
NUMBER IN DISK PARTITION (disk_partition)    120
partition_num=2
DIRECTORY IN DISK PARTITION (GUEST OS)
directory= "/var/log "; "/etc/sysconfig "

SYSTEM INFORMATION SAVE DIRECTORY OF GUEST OS 1 (HOST OS)
save_directory="/var/guest/log/guest_domain_1 "
                :
```

SYSTEM AND METHOD OF CONTROLLING VIRTUAL MACHINE

CROSS-REFERENCE TO RELATED APPLICATIONS

This application is based upon and claims the benefit of priority of the prior Japanese Patent Application No. 2008-252904, filed on Sep. 30, 2008, the entire contents of which are incorporated herein by reference.

FIELD

The embodiments discussed herein are related to a virtual machine system, and a method for managing thereof.

BACKGROUND

In a virtual machine system, one real machine system (physical machine) operates a plurality of virtual machines (VM: Virtual Machine) under the control of a virtual machine monitor (or host OS (operating system)). The virtual machines, each of which is a guest OS, operate various applications.

When a failure (hereinafter "panic"), such as stopping of processing, occurs due to a fatal error in a guest OS in the virtual machine system, the content of the memory and the log information are acquired, and the cause of the failure is investigated.

It is proposed in a virtual machine system to take a copy of a same guest OS with a guest OS in which a failure occurs, including the condition of the memory of the failed guest OS, to store another virtual machine execution environment, thereby realizing a more efficient debug environment.

Japanese Laid-Open Patent Publication No. 6-52130

SUMMARY

According to an aspect of the embodiment, a virtual machine system includes an information processing unit, a plurality of guest virtual machines, a host virtual machine, and a virtual machine monitor. The information processing unit has a CPU and a storage device. The plurality of guest virtual machines, each operated on the CPU, executes an application program. The host virtual machine operated on the CPU controls the virtual machine system and a guest virtual machine, and has save information of system information which defines a save location to save the system information of the guest virtual machine. The save location is in the storage device used by the host virtual machine. The virtual machine monitor operated on the CPU controls the plurality of virtual machines, and includes monitoring unit which monitors the guest virtual machine to detect occurrence of a failure in the guest virtual machine, and collecting unit which collects the system information from the save location based on the save information of system information when the monitoring unit detects the failure in the guest virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 7:
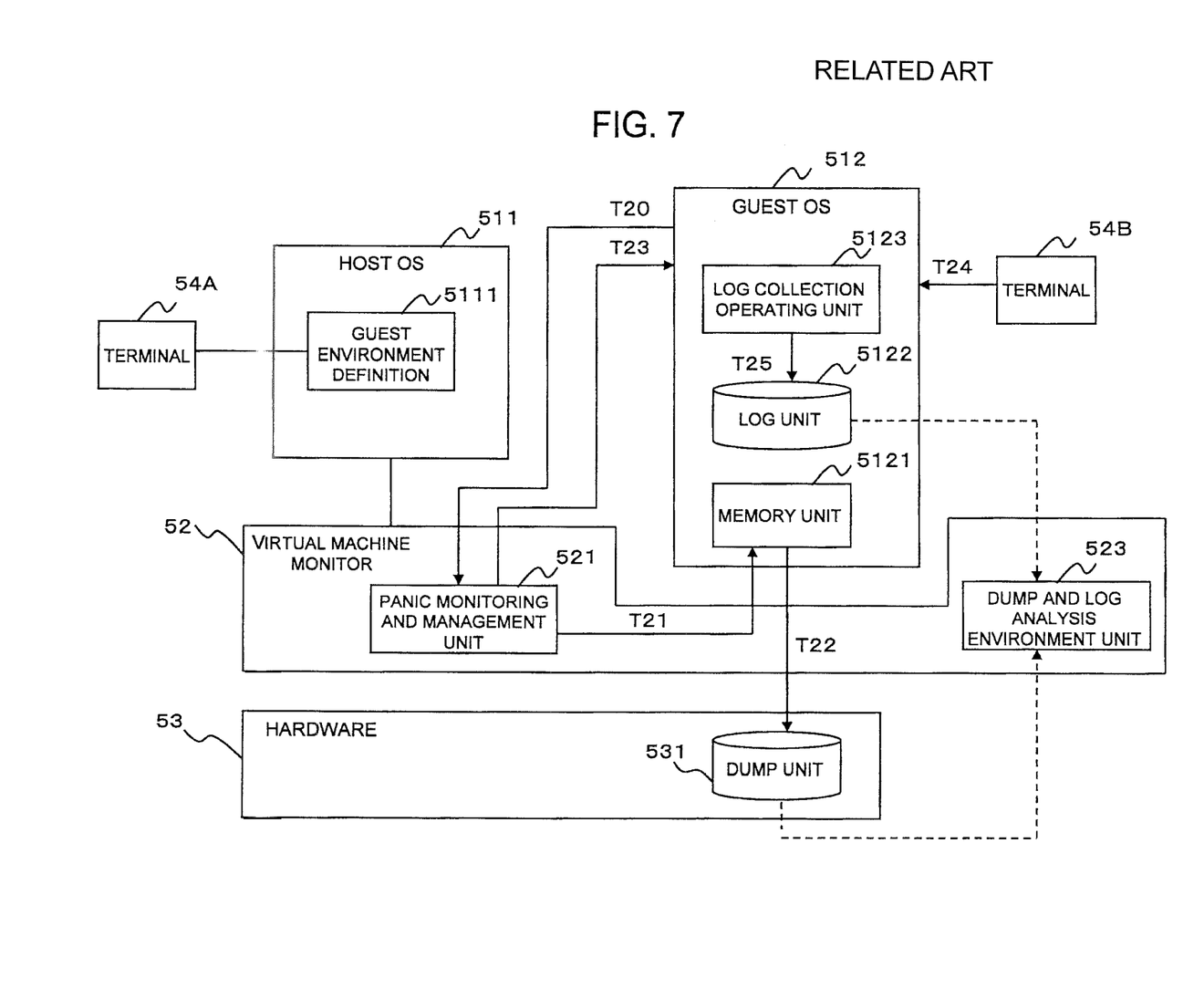
FIG. 7 illustrates an example of a structure of a conventional technique.
Figure 8A:
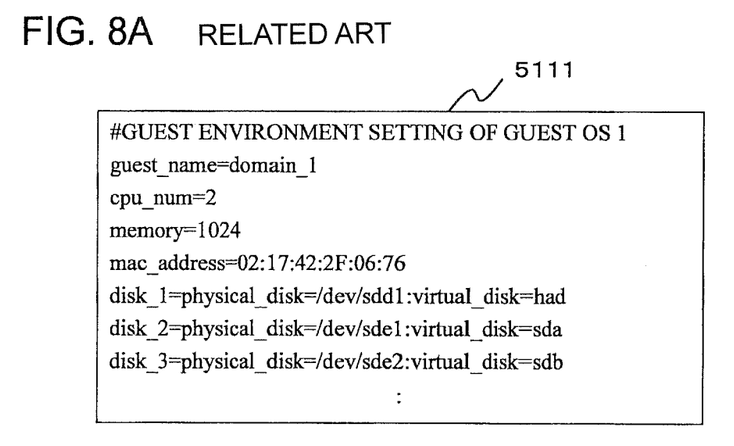
FIG. 8 illustrates a process flowchart of a guest environment definition of the conventional technique and investigation information collection when a panic occurs.
Figure 8B:
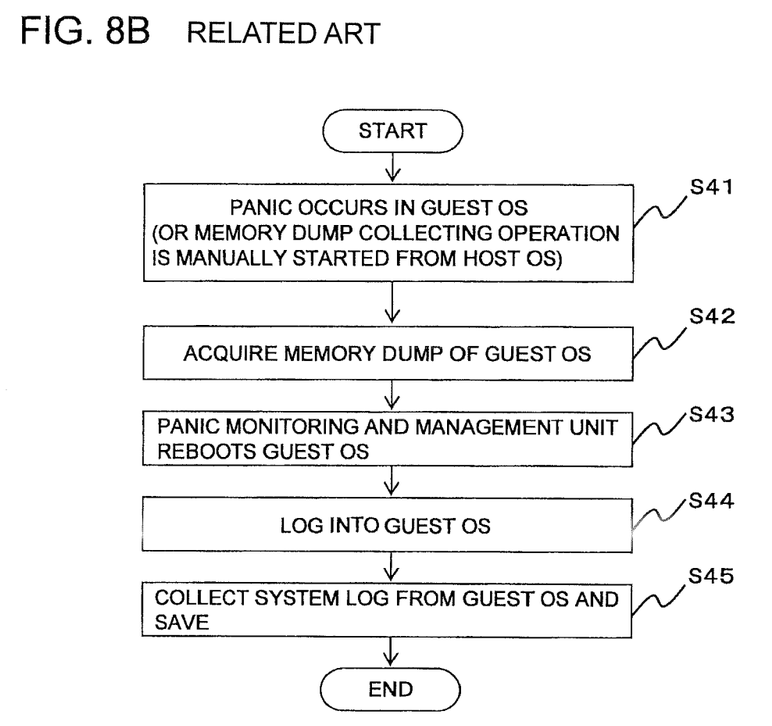

FIGS. 7 and 8 are explanatory views of the virtual machine system which we studied as a background of the present invention. In particular, FIG. 7 illustrates an example of a structure of the virtual machine system. FIG. 8A illustrates an example of a guest environment definition 5111 in the virtual machine system of FIG. 7. FIG. 8B illustrates a collection process flowchart of system information (system log) in the virtual machine system of FIG. 7.

In step S41, when a panic (or various kind of failure) occurs in a guest OS 512, the guest OS 512 stops. A panic monitoring and management unit 521 acquires a memory dump in step S42. More specifically, after detecting the occurrence of panic (T20), the panic monitoring and management unit 521 reads out the content from a memory unit 5121 of the guest OS 512 (T21), and stores the read out content in a dump unit 531 on a real hardware 53 according to the setting in the host OS 511 (T22), for example.

In step S43, the panic monitoring and management unit 521 reboots the target guest OS 512 in which the panic occurred (T23). After the reboot, the user logs into the guest OS 512 through a terminal 54B to collect system information (such as logs) of the guest OS 512 in step S44 (T24). After the login, the log collection operating unit 5123 collects the system information from the log unit 5122 in step S45 according to an instruction of the user (T25), for example, and saves the system information in a dump and log analysis environment unit 523. The guest environment definition 5111 is provided in the host OS 511, and, for example, defines in advance a storage location (disk_1=physical_disk . . . ) in which the system information of the guest OS 512 is stored.

In the virtual machine system we studied, it is needed to collect the memory dump and the system information of the guest OS 512 for analyzing a cause of the failure, when the panic occurs in the guest OS 512. Thus, after the memory dump of the memory unit 5121 of the guest OS 512 is executed, it is needed to reboot the guest OS 512, and to log into the guest OS 512 by the user needs for collecting the system information of the guest OS 512. Thus, it takes much time to collect the system information. And, since the system information cannot be quickly collected, there is a possibility that information is lost which is included in the system information and is preferable to investigate the failure. As a result, the cause of the failure cannot be determined, or a great effort is needed to determine the cause.

According to the virtual machine system and the management method disclosed below, the host virtual machine has save information of system information. Thus, when a failure in a guest virtual machine is detected, the host virtual machine can collect the system information (system log) of the guest virtual machine from a save location based on the save information of system information.

Thus, it is not preferable to log into the guest virtual machine to obtain the system information of the guest virtual machine, and there is no need for the user to collect the system information of the guest virtual machine. As a result, the time preferable to collect the system information can be reduced, and the system information can be quickly collected. Thus, it is possible to prevent the information preferable to investigate the failure in the system information from being lost. As a result, the cause of the failure can be reliably determined, and the effort to determine the cause can be significantly reduced.

According to the management program of the virtual machine system and the recording medium disclosed below, the management program can realize the virtual machine system and the management method of the virtual machine system having the structure above described.

Preferred embodiments of the present invention will be explained with reference to accompanying drawings.

Figure 1:
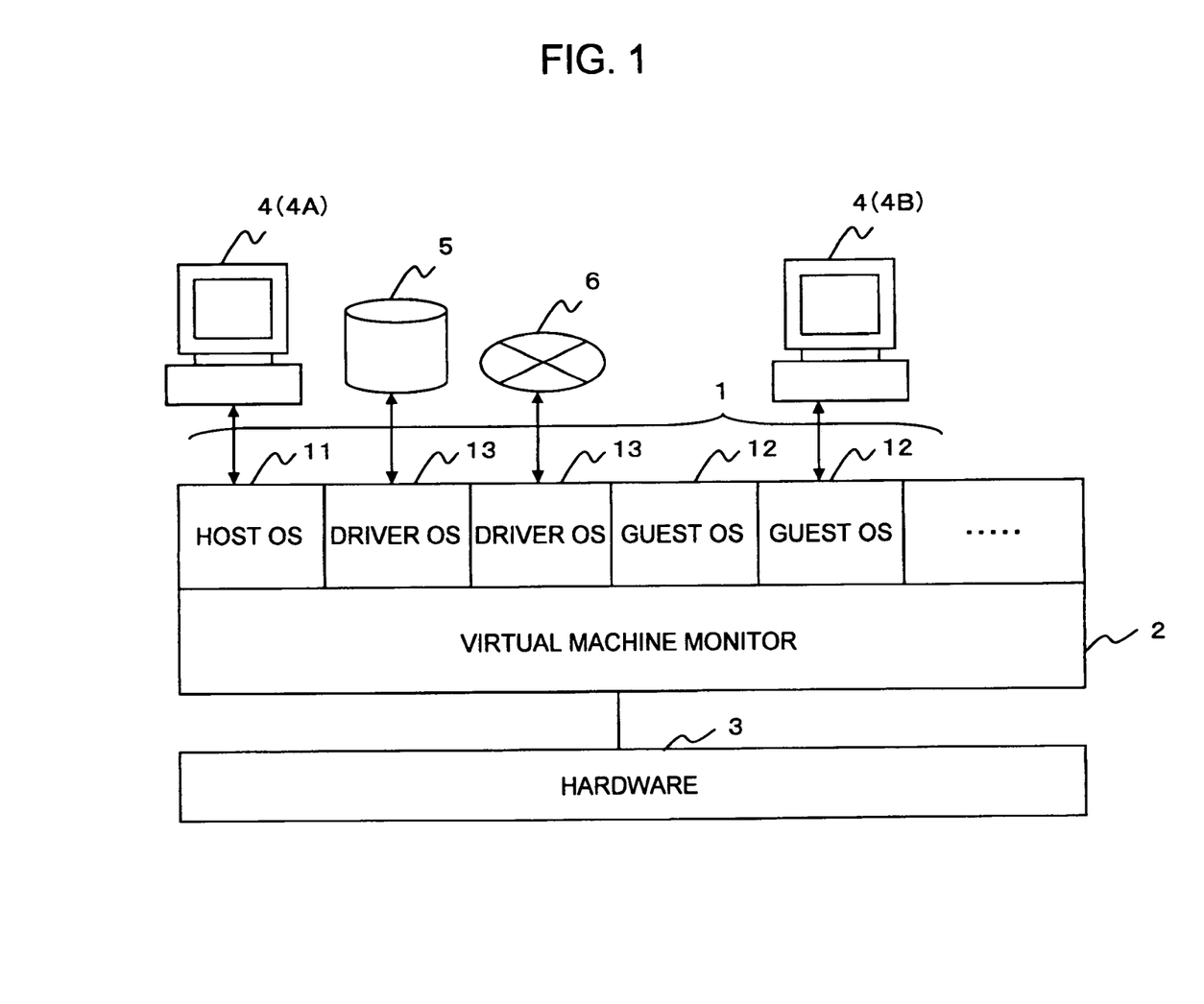
FIG. 1 illustrates an example of a structure of a virtual machine system.

FIG. 1 illustrates an example of a structure of a virtual machine system. The virtual machine system includes virtual machines (VM) 1, a virtual machine monitor (VMM or Hypervisor) 2, and a hardware (in other words, information processing unit) 3. The virtual machine monitor 2 and the virtual machines 1 operate on the hardware 3. The hardware 3 includes one or more physical (or real) CPUs and one or more physical (or real) storage devices. The storage device includes, for example, one or more main storage devices (main memories) and one or more peripheral storage devices such as magnetic disk devices.

The virtual machine system includes a plurality of virtual machines 1. More specifically, each of a host OS (operating system, or control program) 11, each of a plurality of guest OS 12, and each of a plurality of driver OS 13 is a virtual machine 1. Each of the plurality of OS 11 to 13 acquires a control right of one physical CPU of the hardware 3, and is executed on the one physical CPU, thereby each of the virtual machines 1 is realized. Thus, the virtual machines 1 are formed by programs operated on the CPU, and the hardware 3. The virtual machine monitor 2 is also realized in the same way.

The virtual machine monitor 2 controls the entire virtual machine system. Thus, the virtual machine monitor 2 controls the plurality of virtual machines 1. Specifically, the virtual machine monitor 2 dispatches the plurality of virtual machines or the plurality of OS 11 to 13 (allocates the control right of the physical CPU), emulates a privileged instruction executed by the plurality of OS 11 to 13, and controls the hardware 3 such as a physical CPU.

Single host OS 11 is provided. And, the host OS 11 operates as a virtual machine (domain), and manages (controls) the entire virtual machine system with the virtual machine monitor 2. The host OS 11 is activated when the virtual machine system is booted, and then controls the plurality of guest OS 12 and the plurality of driver OS 13 (entire control including activation, termination, and so forth). At the same time, the host OS 11 can also operate as a driver OS 13.

The host OS 11 includes a console or a terminal 4 (4A) such as a display device. The guest OS 12 includes terminal 4B. The user can log into the guest OS 12 through the terminal 4B.

The driver OS 13 is an OS which controls physical (or real) input/output devices (I/O devices) 5 and 6. The physical I/O devices 5 and 6 includes a plurality of types of magnetic disk devices 5 and networks 6, for example. The driver OS 13 is provided for each of the plurality of types of physical I/O devices 5 and 6. The driver OS 13 controls the physical I/O devices 5 and 6. The driver OS 13 can also operate on the host OS 11 and the plurality of guest OS 12. When the driver OS 13 operates on the guest OS 12, the guest OS 12 appears to serve as the driver OS 13.

The guest OS 12 is an OS which do not include the physical I/O devices 5 and 6. The guest OS 12 can be thought of as normal (so-called) OS. For example, an application program is operated on one of the plurality of guest OS 12. Thus, the guest OS 12 executes the application program. The guest OS 12 can execute I/O commands by requesting the driver OS 13 to execute the I/O commands.

Figure 2:
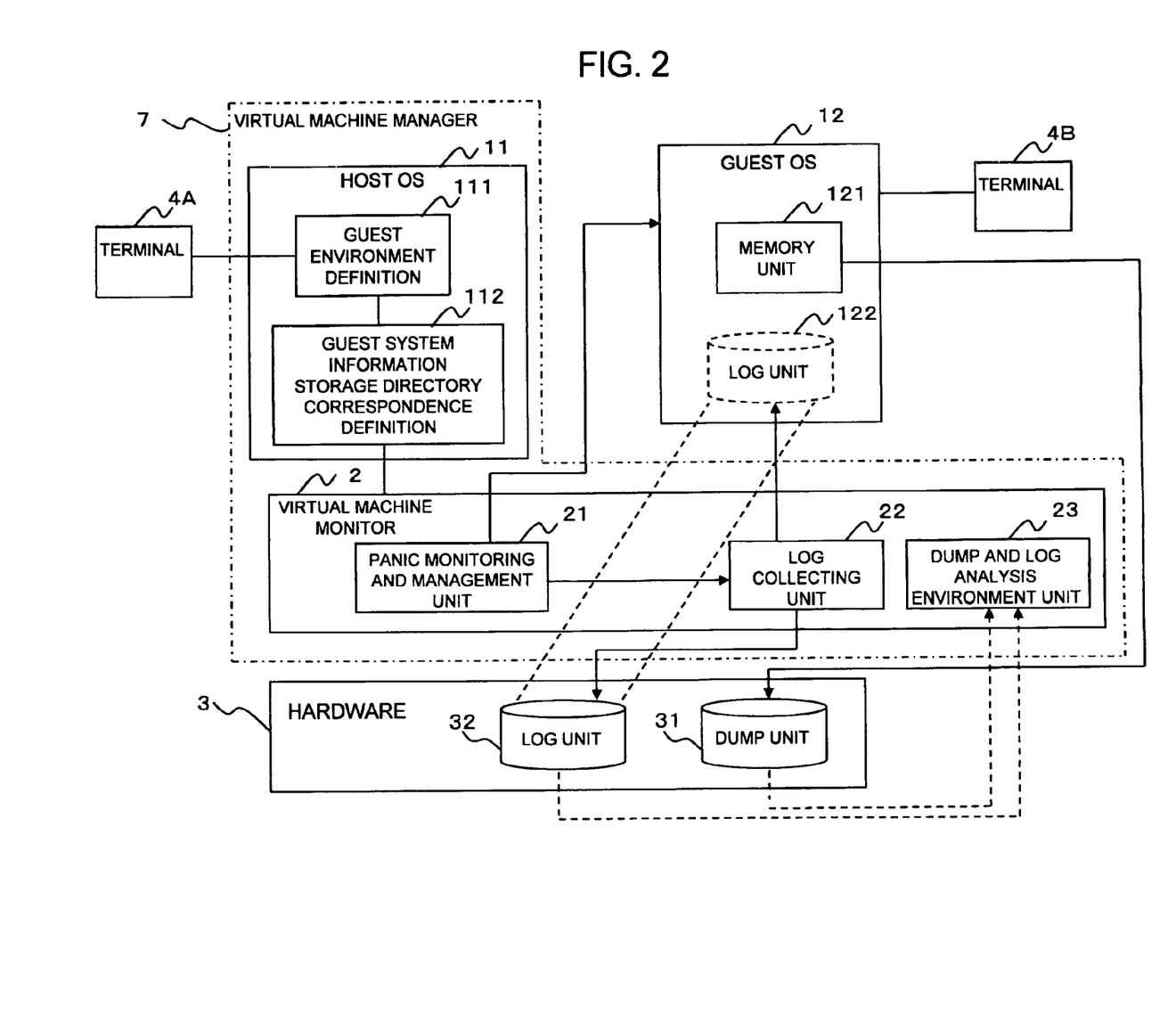
FIG. 2 illustrates an example of a structure of a virtual machine manager and a hardware.

FIG. 2 mainly illustrates an example of a structure of a virtual machine manager 7 and the hardware 3 in the virtual machine system of FIG. 1. In FIG. 2, only one guest OS 12 is illustrated as the virtual machine 1. The following explanation is described in a case that the virtual machine 1 is the guest OS 12. However, the same applies when the virtual machine 1 is the OS 11 or OS 13. The host OS 11 and the virtual machine monitor 2 are the virtual machine manager 7.

The host OS 11 includes a guest environment definition 111 and a guest system information storage area correspondence definition (hereinafter "guest storage definition") 112 for each guest OS 12. The guest environment definition 111 and the guest storage definition 112 is described below with reference to FIG. 3.

The guest OS 12 includes a memory unit 121 and a log unit 122. And, the hardware 3 includes a physical CPU, a dump unit 31, and a log unit 32 (for example, a magnetic disk device).

The virtual machine monitor 2 includes a panic monitoring and management unit 21, a log collecting unit 22, and a dump and log analysis environment unit 23.

The panic monitoring and management unit 21 is monitoring unit which monitors the guest OS 12 to detect a failure in the guest OS 12. Specifically, the panic monitoring and management unit 21 monitors whether a panic occurred in the guest OS 12, and, when the panic occurred, copies and stores a memory image (or content) of the memory unit 121 of the guest OS 12 into the dump unit 31 of the hardware 3.

The log collecting unit 22 is collecting unit which collects system information from a save location (or save area) based on the guest storage definition 112, when the failure in the guest OS 12 is detected. In the collection process, the log collecting unit 22 executes instruction information of the guest storage definition 112 based on the guest storage definition 112, and then collects the system information. In this process, the log collecting unit 22 refers to the guest environment definition 111, and based on this definition, refers to the guest storage definition 112 which is linked to the guest environment definition 111. Based on a save location of the guest storage definition 112, the log collecting unit 22 reads out the system information (system log) of the guest OS 12 from the save location.

The dump and log analysis environment unit 23 analyzes the content of the memory unit 121, which is stored in the dump unit 31, and the system information (system log) stored in the log unit 32.

In the guest OS 12, the memory unit 121 is a memory area which stores the memory image of the guest OS 12. The log unit 122 is a memory area storing system information (log, configuration file, etc.) of the guest OS 12.

In the hardware 3, the dump unit 31 and the log unit 32 are provided in an external storage device such as a magnetic disk. The virtual machine manager 7 stores the memory image of the memory unit 121 of the guest OS 12 in the dump unit 31. The virtual machine manager 7 (specifically, the log collecting unit 22) collects the system information of the log unit 122 of the guest OS 12, and stores the system information in the log unit 32 of the hardware 3.

Figure 3:
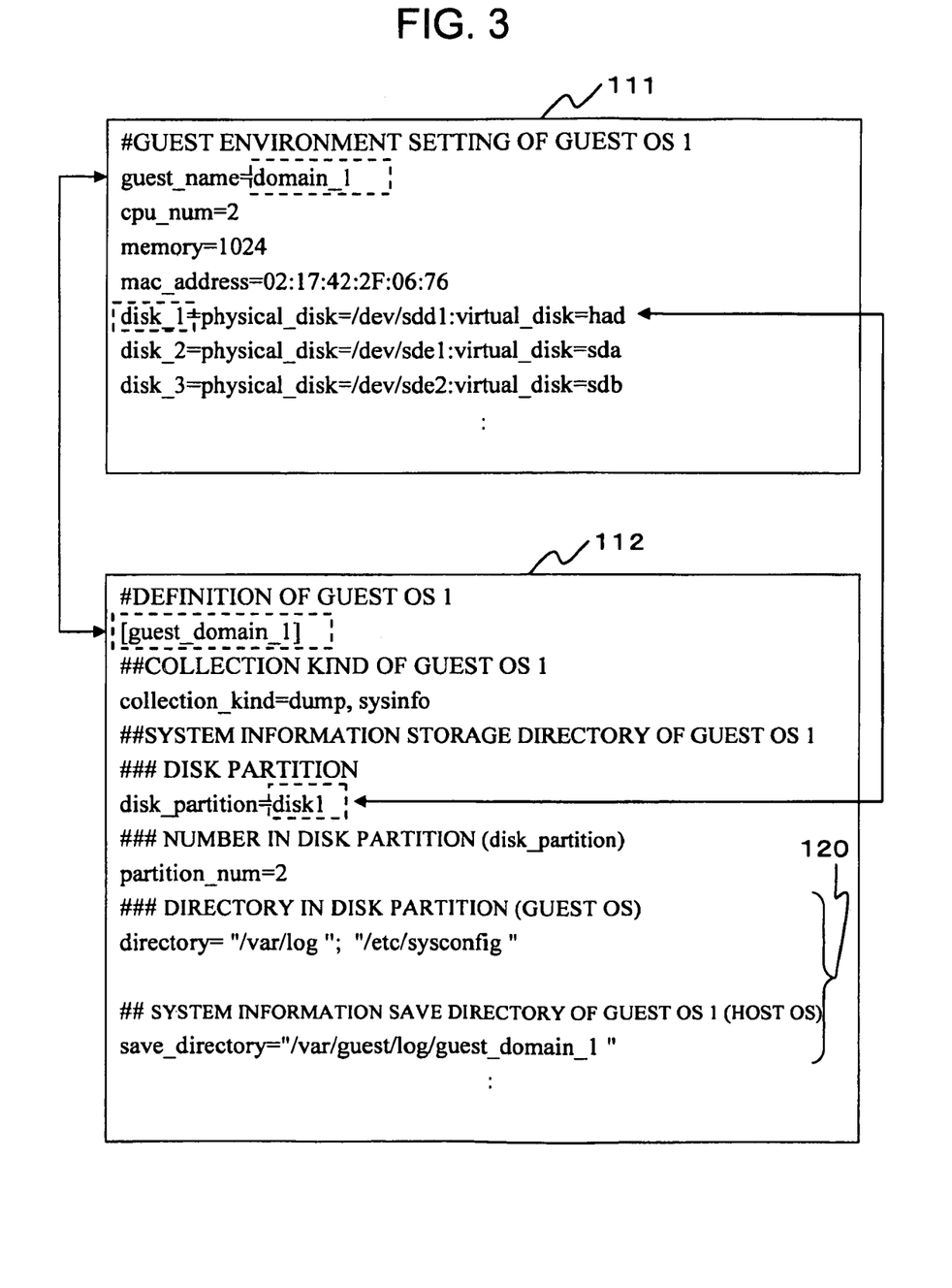
FIG. 3 illustrates an example of a guest environment definition and a guest system information storage area correspondence definition.

FIG. 3 illustrates an example of the guest environment definition 111 and the guest storage definition 112 in the virtual machine system of FIG. 2.

The guest environment definition 111 is environment definition information which defines an operating environment of the guest OS 12. The guest environment definition 111 defines guest name (guest_name), a number of physical CPUs (cpu_num), memory capacity (memory), a MAC address (mac_address), and a plurality of disks (disk_N). The guest environment definition 111 is linked with the guest storage definition 112 by writing the same guest name (guest_name) in the guest environment definition 111 and the guest storage definition 112.

The guest storage definition 112 includes save information of system information. The guest storage definition 112 defines in advance a save location in a storage device used by the host OS 11, and the system information of the guest OS 12 is saved to the save location. Further, the guest storage definition 112 includes a storage location in a storage device used by the guest OS 12, and the system information of the guest OS 12 is stored in the storage location. The guest storage definition 112 further includes instruction information indicating whether to acquire the memory dump of the guest OS 12.

The guest storage definition 112 is information for collecting the system information (log, and configuration file) of the guest OS 12 from the host OS 11. The system information includes, for example, log information and configuration files. The guest storage definition 112 defines "definition of guest OS n" and "collection kind (or type) of guest OS n." In this case, "n" denotes an integer. The guest storage definition 112 further defines "disk partition," "number in disk partition," "directory in disk partition," and "save location of system information of guest OS n" as a system information storage area of the guest OS n.

The guest_name of the guest environment definition 111 is set to the "definition of guest OS n." The values "dump" (memory dump of the guest OS 12) and "sysinfo" (instruction information for collecting the system information of the guest OS 12) are set to collection_kind for the "collection kind of guest OS n." The value "dump" is information for instructing the memory dump of the guest OS 12. The value "sysinfo" is information for instructing the collection of the system information of the guest OS 12. One or both of the values "dump" and "sysinfo" can be set. The "disk partition" (for example, "disk1" in FIG. 3) of the guest storage definition 112 indicates a physical disk and a logical disk corresponding to "disk_1" of the guest environment definition 111.

In place of the definitions of the "directory in disk partition" and "system information save area of guest OS n," the host OS 11 may specify a parameter ("batch_file") of a batch file (command) for collecting the system information of the guest OS 12 to a definition part 120.

The virtual machine monitor 2 refers to the guest environment definition 111 and the guest storage definition 112 of the host OS 11. The log collecting unit 22 may also be designed to be able to refer to the guest environment definition 111 and the guest storage definition 112. Thus, the log collecting unit 22 can refer to the guest environment definition 111 and the guest storage definition 112 from the guest name, since the panic monitoring and management unit 21 notifies the guest name of the guest OS 12, in which a panic occurred, to the log collecting unit 22. As a result, the panic monitoring and management unit 21 can identify the storage area of the collected information (system information storage area), in which the memory dump and the system information are collected, based on the information of the guest storage definition 112 corresponding to the guest name of the guest environment definition 111.

Figure 4:
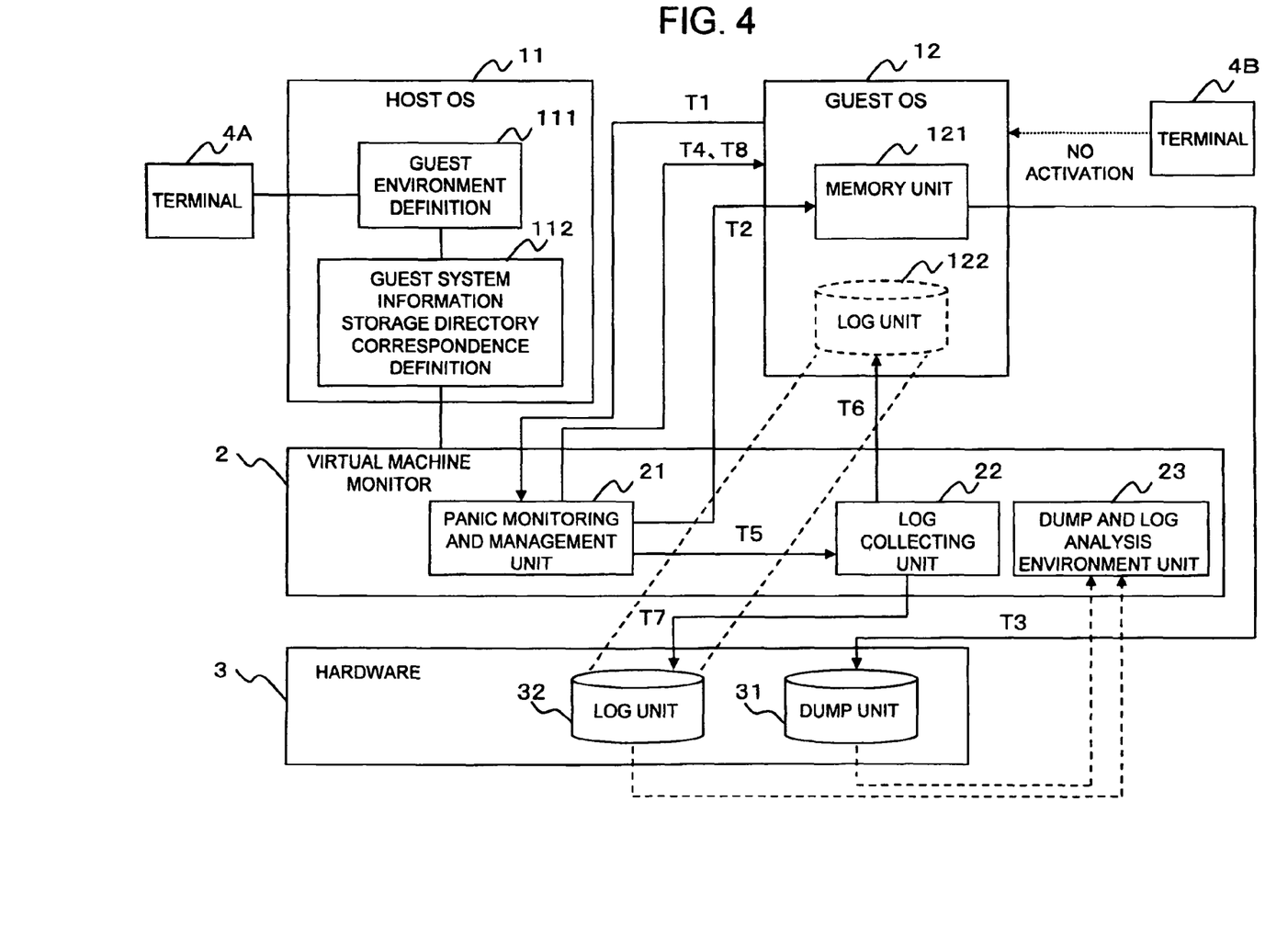
FIG. 4 illustrates a summary of the operation when a panic occurs.

FIG. 4 illustrates a summary of an operation when the panic occurred in the virtual machine system having the structure of FIG. 2.

The guest OS 12 stops when a panic occurs in the guest OS 12. Meanwhile, the panic monitoring and management unit 21 monitors the occurrence of a panic in the guest OS 12. When a panic occurs in the guest OS 12 (T1), the panic monitoring and management unit 21 reads the memory unit 121 (memory image) of the guest OS 12 after detecting the occurrence of panic (T2), and stores the memory image in the dump unit 31 on the real hardware 3 by automatic or manual setting of host OS 11 (T3).

The panic monitoring and management unit 21 then reboots the target guest OS 12 in which the panic occurred (T4), and notifies the collection of the log of the guest OS 12 to the log collecting unit 22 (T5). In response, the log collecting unit 22 collects the system information from the log unit 122 (T6), and stores the system information to the log unit 32 (T7).

Subsequently, the user uses the dump and log analysis environment unit 23 to analyze the failure information based on the data stored in the dump unit 31 and the log unit 32.

Figure 5:
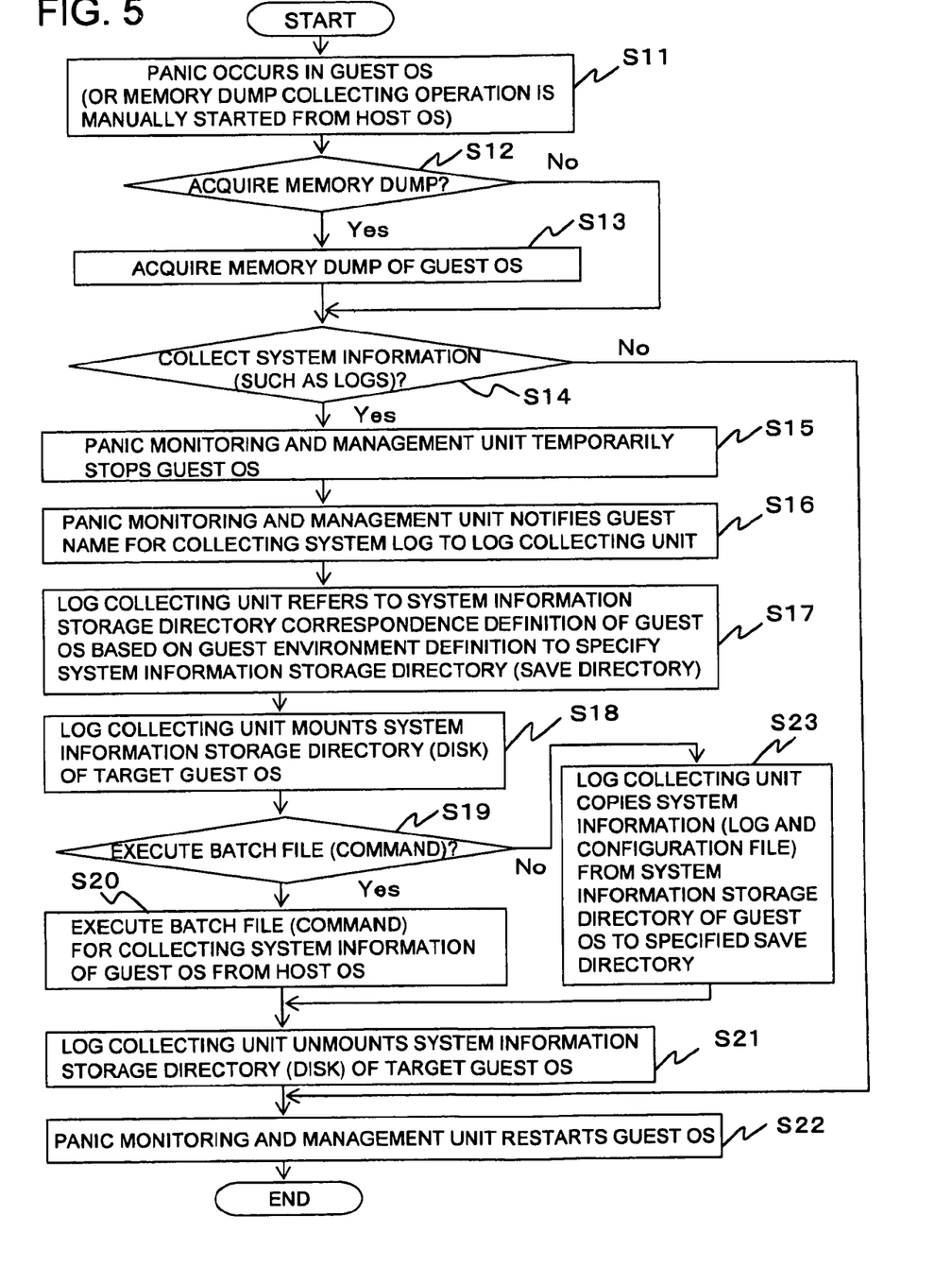
FIG. 5 illustrates a process flowchart of investigation information collection.

FIG. 5 illustrates a process flowchart of investigation information collection in the virtual machine system of FIG. 2.

In the virtual machine system of FIG. 2, the present process starts when the panic monitoring and management unit 21 included in the virtual machine monitor 2 monitors the occurrence of panic in the guest OS 12, and captures the occurrence of panic. Alternatively, the present process starts when the user logs into the host OS 11 from the terminal 4A, and starts a memory dump collecting operation by manual instruction (step S11). In the example of FIG. 5, when the guest OS 12 includes a memory dump function, the memory dump function executes the memory dump. In this case, the memory dump is also collected from the host OS 11 because the content of the memory is saved in the disk in the guest OS 12.

The panic monitoring and management unit 21 which monitors the occurrence of panic determines whether to execute the memory dump acquisition to the dump unit 31 of the hardware 3 in relation to the memory image of the memory unit 121 of the guest OS 12 (step S12). Specifically, the determination is performed when the panic monitoring and management unit 21 monitors, and captures the occurrence of panic, or when the host OS 11 transmits the notification of the request for acquiring the memory dump of the memory unit 121 to the virtual machine manager 7 in response to the instruction from the terminal 4A. Thus, in the example of FIG. 5, the memory dump collecting function of the guest OS 12 is used to collect the memory dump based on the instruction from the host OS 11.

The memory dump of the guest OS 12 usually requires several GB (memory size allocated to the guest OS 12) of disk capacity. However, a capacity of only about several tens of MB is needed when the collection of the memory dump is not selected, because only the system information is collected. As a result, the collection time of the debug information (collection of only the system information) can be reduced (several tens of minutes are reduced to about several minutes) compared to when the memory dump is also collected.

In general, much time (several tens of minutes) is needed to acquire the memory dump of the guest OS 12. Thus, for example, the data (system information) for failure investigation can be collected first during that time, and the data can be provided to the user (failure analyzer). Thus, the recovery time of the work performed on the virtual machine system can be further reduced.

In the step S12, when the panic monitoring and management unit 21 instructs the guest OS 12 to acquire the memory dump, the guest OS 12 stores the memory image of the memory unit 121 in the dump unit 31 included in the hardware 3 (step S13). On the other hand, when the panic monitoring and management unit 21 determines not to acquire the memory dump in the step S12, the process moves to step S14.

The panic monitoring and management unit 21 then determines whether to collect the system information (such as logs) of the log unit 122 of the guest OS 12 (step S14). When the panic monitoring and management unit 21 determines to collect the system information in the step S14, the process moves to step S15. When the panic monitoring and management unit 21 determines not to collect the system information, the process moves to step S22.

When the system information is to be collected, the panic monitoring and management unit 21 instructs the target guest OS 12 to temporarily terminate in order to collect the system information of the target guest OS 12 (step S15). The panic monitoring and management unit 21 then notifies the information, such as guest name, for collecting the system log of the guest OS 12 to the log collecting unit 22 (step S16).

After receiving the notification, the log collecting unit 22 refers to the guest storage definition 112 of the target guest OS 12 based on the guest environment definition 111 to identify the save are of the system information (step S17). After identifying the save area, the log collecting unit 22 mounts the system information storage area (save area: log unit 32, a disk for example) of the target guest OS 12 (step S18).

The log collecting unit 22 determines whether the execution of a batch file (command) is set in the referenced guest storage definition 112 (step S19). When the execution of a batch file is set, the host OS 11 executes a batch file for collecting the system information of the target guest OS 12 (step S20). On the other hand, when the execution of a batch file is not set, the log collecting unit 22 copies the system information (log and configuration file) in the log unit 122 of the guest OS 12 to the specified system information storage area (log unit 32) (step S23).

The log collecting unit 22 then unmounts the system information storage area (log unit 32) of the target guest OS (step S21). Subsequently, the panic monitoring and management unit 21 restarts the target guest OS 12 (step S22).

Thus, the system information preferable to investigate the failure can be collected at the same time as the acquisition of the memory dump of the guest OS 12 without involving the user. Thus, forgetting to collect the system information can be prevented, and the system information can be reliably collected. The host OS 11 can also directly collect the system information of each guest OS 12. Thus, the system information of all of the plurality of guest OS 12 can be collectively or selectively collected from the host OS 11.

Figure 6:
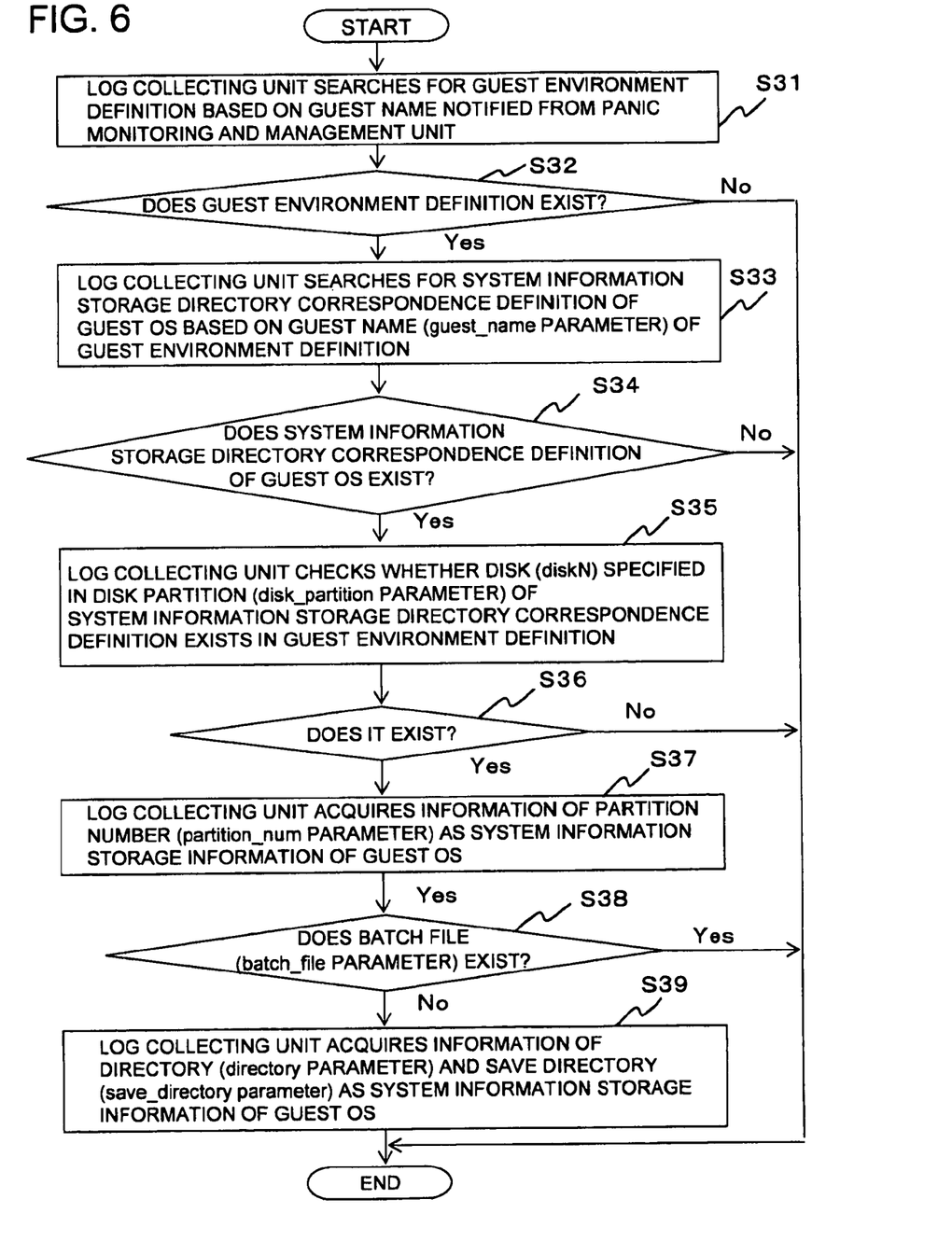
FIG. 6 illustrates a search process flowchart of a system information storage area of a guest OS.

FIG. 6 illustrates a search process flowchart of the system information storage area of the guest OS 12 in the virtual machine system of FIG. 2. The present process starts when the panic monitoring and management unit 21 notifies the guest name to the log collecting unit 22 included in the virtual machine monitor 2.

The log collecting unit 22 searches for the guest environment definition 111 based on the guest name notified from the panic monitoring and management unit 21 (step S31). When the log collecting unit 22 determines that the guest environment of the guest OS 12 is set in the guest environment definition 111, the process moves to the following step S33.

On the other hand, when the log collecting unit 22 determines that the guest environment of the guest OS 12 is not set in the guest environment definition 111, the present process flowchart ends.

In the step S33, the log collecting unit 22 searches for the guest storage definition 112 of the target guest OS 12 based on the guest name (guest-name parameter) of the guest environment definition 111. In the step S34, when the log collecting unit 22 determines that there is a definition of the system information storage area of the target guest OS 12 in the guest storage definition 112, the process moves to the following step S35. On the other hand, when the log collecting unit 22 determines that there is no definition of the system information storage area of the target guest OS 12 in the guest storage definition 112, the present process flowchart ends.

In the step S36, the log collecting unit 22 examines whether the disk (diskN) specified in the disk partition (disk_partition parameter) of the guest storage definition 112 exists in the guest environment definition 111. After the examination, when the specified disk exists in the guest environment definition 111, the log collecting unit 22 moves the process to step S37. When the specified disk is not in the guest environment definition 111, the log collecting unit 22 ends the process.

The log collecting unit 22 then acquires the information of the number in the disk partition (partition_num parameter) from the guest storage definition 112 as the system information storage information of the guest OS 12 (step S37).

The log collecting unit 22 examines whether a batch file (batch_file parameter) exists in the guest storage definition 112 (step S38). When there is a batch file, the present process flowchart ends. When there is no batch file, the log collecting unit 22 acquires the information of the directory in the disk partition (directory parameter) and the save area of the system information (save-directory parameter) as the system information storage area of the guest OS 12 (step S39). The process then ends.

The system information of the guest OS 12 is preferable to investigate the failure may be manually collected and saved from the host OS 11 when the host OS 11 detects an abnormality of the guest OS 12. Thus, the host OS 11 may be designed to collect the system information of the guest OS 12 according to an instruction input of the user (manually). In this case, the operation of the guest OS 12 may be temporarily stopped upon the collection, or the operation of the guest OS 12 may be restarted before the collection.

The system information may be designed to be collected as preferable without the guest OS 12 being rebooted when the guest OS 12 is operating normally (no operation abnormality or system panic). In this case, as described above, only the system information of the guest OS 12 can be collected without the execution of the memory dump of the guest OS 12. As a result, the system recovery time of the guest OS 12 can be reduced, and almost no load is imposed on the host OS 11. Thus, influence on the operation of other guest OS 12 can be limited.

In the case of the virtual machine system through a network, the system information of each of the plurality of guest OS 12 can be collected from the host OS 11 without imposing a significant load on the network.

When the guest OS 12 includes a memory dump function, the memory dump is performed by the memory dump function. Thus, the memory dump can be collected from the host OS 11 even when login to the guest OS 12 is not possible, such as when the guest OS 12 cannot be activated.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the sprit and scope of the invention.

What is claimed is:

1. An information processing system on which a plurality of virtual machines and a host operating system that controls the plurality of virtual machines are operated, the information processing system comprising:
    a memory that is used for operation of the plurality of virtual machines;
    a storage device that is different from the memory, and is possible to be accessed by the host operating system;
    a storing unit that is different from the memory and the storage device, and stores save information of system information for each of the plurality of virtual machines, each save information of system information relating first information and second information with each other, the first information indicating a location at which system information of each virtual machine is stored in the memory, the second information indicating a save location to which the system information of the each virtual machine is to be saved in the storage device;
    a monitoring unit that detects a failure occurred in any of the plurality of virtual machines;
    a stopping unit that, when the failure is detected by the monitoring unit, stops a virtual machine in which the failure is detected;
    a saving unit that, when the virtual machine in which the failure is detected is stopped, saves system information of the virtual machine in which the failure is detected from the virtual machine where the failure is detected to the save location in the storing unit based on the save information of system information; and
    a collecting unit that collects the system information that is saved at the save location, and
    wherein environment definition information is provided which is related with the save information of system information and defines an operation environment for each of the plurality of virtual machines, and the collecting unit refers to the save information of system information related with the environment definition information based on the environment definition information.

2. The information processing system according to claim 1, wherein each save information of system information includes a storage location at which the system information of each virtual machine is stored and the storage location indicates a location in the storage device used by each virtual machine.

3. The information processing system according to claim 1, wherein each save information of system information includes instruction information indicating whether a memory dump of each virtual machine is to obtained, and the collecting unit collects the system information after executing the instruction information based on the save information of system information.

4. The information processing system according to claim 1, wherein processings of the monitoring unit, the stopping unit, the saving unit, and the collecting unit are executed by the host operating system or a virtual machine monitor that controls the information processing system.

5. A method to manage an information processing system on which a plurality of virtual machines and a host operating system that controls the plurality of virtual machines are operated, and which has a memory that is used for operation of the plurality of virtual machines, and a storage device that is different from the memory and is possible to be accessed by the host operating system, the method comprising:
    storing, in a storing unit that is different from the memory and the storage device, save information of system information for each of the plurality of virtual machines, each save information of system information relating first information and second information with each other, the first information indicating a location at which system information of each virtual machine is stored in the memory, the second information indicating a save location to which the system information of the each virtual machine is to be saved in the storage device;
    detecting a failure occurred in any of the plurality of virtual machines;
    stopping, when the failure is detected by the monitoring unit, a virtual machine in which the failure is detected;
    saving, when the virtual machine in which the failure is detected is stopped, system information of the virtual machine in which the failure is detected from the virtual machine where the failure is detected to the save location in the storing unit based on the save information of system information; and
    collecting the system information that is saved at the save location, and
    wherein environment definition information is provided which is related with the save information of system information and defines an operation environment for each of the plurality of virtual machines, and the collecting refers to the save information of system information related with the environment definition information based on the environment definition information.

6. A non-transitory computer readable recording medium recording a management program of an information processing system on which a plurality of virtual machines and a host operating system that controls the plurality of virtual machines are operated to cause a computer to execute operations, and which has a memory that is used for operation of the plurality of virtual machines, and a storage device that is different from the memory and is possible to be accessed by the host operating system, the operations comprising:
    storing, in a storing unit that is different from the memory and the storage device, save information of system information for each of the plurality of virtual machines, each save information of system information relating first information and second information with each other, the first information indicating a location at which system information of each virtual machine is stored in the memory, the second information indicating a save location to which the system information of the each virtual machine is to be saved in the storage device;
    detecting a failure occurred in any of the plurality of virtual machines;
    stopping, when the failure is detected by the monitoring unit, a virtual machine in which the failure is detected;
    saving, when the virtual machine in which the failure is detected is stopped, system information of the virtual machine in which the failure is detected from the virtual machine where the failure is detected to the save location in the storing unit based on the save information of system information; and
    collecting the system information that is saved at the save location, and wherein environment definition information is provided which is related with the save information of system information and defines an operation environment for each of the plurality of virtual machines, and the collecting refers to the save information of system information related with the environment definition information based on the environment definition information.

\* \* \* \* \*

UNITED STATES PATENT AND TRADEMARK OFFICE
CERTIFICATE OF CORRECTION

PATENT NO. : 8,423,997 B2
APPLICATION NO. : 12/461254
DATED : April 16, 2013
INVENTOR(S) : Hidehiko Nakai It is certified that error appears in the above-identified patent and that said Letters Patent is hereby corrected as shown below:

On the Title Page, Item (54) and in the Specification, Column 1, Lines 1-2, (Title), Delete "SYSTEM AND METHOD OF CONTROLLING VIRTUAL MACHINE" and insert -- FAILURE MANAGEMENT OF VIRTUAL MACHINE USING STORAGE LOCATIONS AND SAVE LOCATION --, therefor.

Signed and Sealed this
Twenty-fourth Day of September, 2013

Teresa Stanek Rea
*Deputy Director of the United States Patent and Trademark Office*